(12) United States Patent
Matsuda

(10) Patent No.: US 11,952,972 B2
(45) Date of Patent: Apr. 9, 2024

(54) BOOSTER

(71) Applicant: DENSO CORPORATION, Kariya (JP)

(72) Inventor: Kunihiko Matsuda, Kariya (JP)

(73) Assignee: DENSO CORPORATION, Kariya (JP)

( * ) Notice: Subject to any disclaimer, the term of this patent is extended or adjusted under 35 U.S.C. 154(b) by 84 days.

(21) Appl. No.: 17/813,853

(22) Filed: Jul. 20, 2022

(65) Prior Publication Data

US 2022/0356861 A1 Nov. 10, 2022

Related U.S. Application Data

(63) Continuation of application No. PCT/JP2021/001587, filed on Jan. 19, 2021.

(30) Foreign Application Priority Data

Jan. 24, 2020 (JP) ................................. 2020-009838

(51) Int. Cl.
*F02N 11/00* (2006.01)
*F02N 11/08* (2006.01)

(52) U.S. Cl.
CPC ........ *F02N 11/087* (2013.01); *F02N 11/0814* (2013.01); *F02N 2011/0874* (2013.01); *F02N 2200/063* (2013.01)

(58) Field of Classification Search
CPC ............... F02N 11/087; F02N 11/0814; F02N 11/0862; F02N 2011/0874; F02N 2200/063; F02N 2011/0888; F02N 2250/02; H02J 7/0029; H02J 7/0063; H02J 7/007182; H02J 7/345; H02J 2207/20; Y02T 10/40
See application file for complete search history.

(56) References Cited

U.S. PATENT DOCUMENTS

| 10,370,025 | B2 * | 8/2019 | Yamanaka | H02P 6/085 |
| 2005/0099155 | A1 * | 5/2005 | Okuda | H02J 7/1438 320/162 |
| 2009/0089605 | A1 * | 4/2009 | Westwick | H03K 17/223 713/340 |
| 2009/0206660 | A1 * | 8/2009 | Makita | H02J 7/1423 307/9.1 |
| 2009/0243574 | A1 * | 10/2009 | Mayuzumi | F02D 41/20 323/282 |
| 2010/0246086 | A1 * | 9/2010 | Ishiguro | F16F 13/26 361/160 |
| 2014/0278022 | A1 * | 9/2014 | Shoji | F02N 11/0862 701/113 |
| 2015/0251690 | A1 | 9/2015 | Yamamoto | |

FOREIGN PATENT DOCUMENTS

| JP | 5561610 B | 7/2014 |
| JP | 2018-121453 A | 8/2018 |

* cited by examiner

*Primary Examiner* — Phutthiwat Wongwian
*Assistant Examiner* — Sherman D Manley
(74) *Attorney, Agent, or Firm* — MASCHOFF BRENNAN

(57) ABSTRACT

A booster is mounted on a vehicle having an idle stop function. The booster boosts an input voltage supplied from a battery, and outputs the boosted input voltage to an in-vehicle device. The booster includes a booster circuit and an output voltage sensor. The booster circuit is a chopper-type, and includes a reactor having one end connected to the battery and a switching element connected between an other end of the reactor and a ground. The output voltage sensor detects an output voltage of the booster circuit.

3 Claims, 8 Drawing Sheets

FIRST EMBODIMENT

NORMAL STATE

FIRST EMBODIMENT

MOS OPEN FAILURE

FIG. 7A  COMPARATIVE EXAMPLE
NORMAL STATE
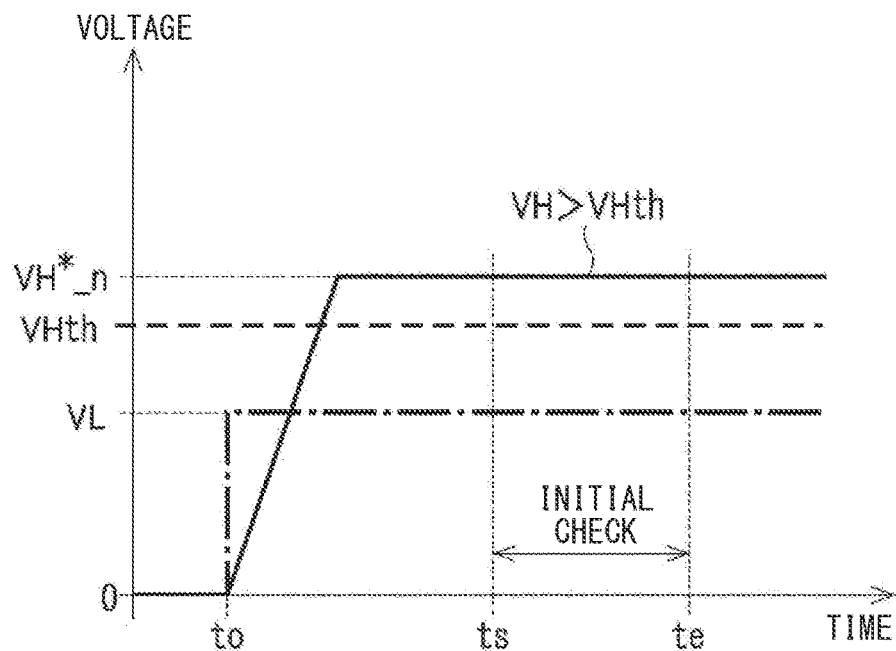
FIG. 7B  COMPARATIVE EXAMPLE
MOS OPEN FAILURE
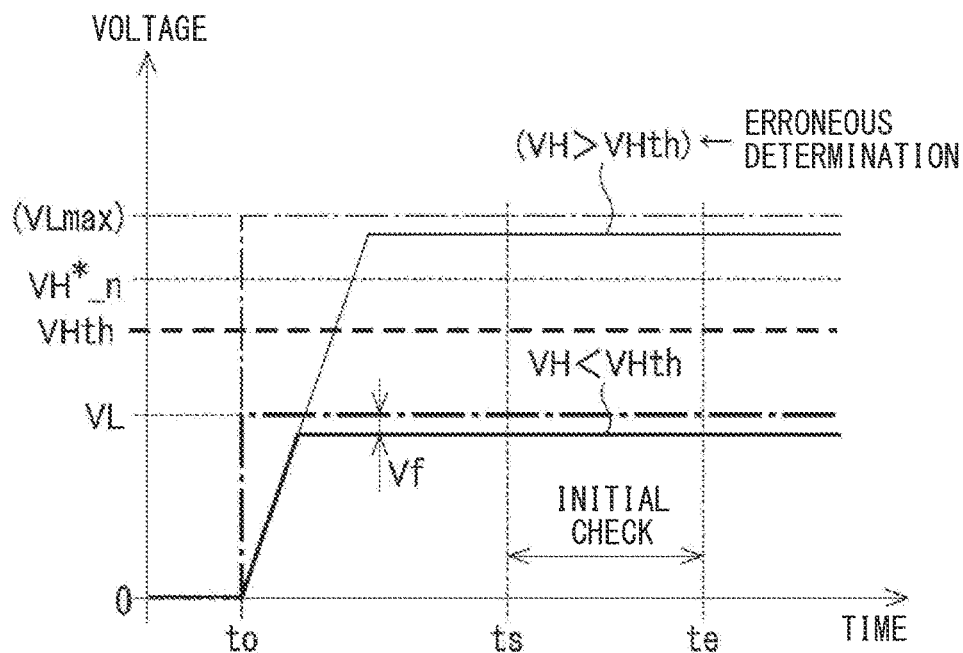

BOOSTER

CROSS REFERENCE TO RELATED APPLICATIONS

The present application is a continuation application of International Patent Application No. PCT/JP2021/001587 filed on Jan. 19, 2021, which designated the U.S. and claims the benefit of priority from Japanese Patent Application No. 2020-009838 filed on Jan. 24, 2020. The entire disclosures of all of the above applications are incorporated herein by reference.

TECHNICAL FIELD

The present disclosure relates to a booster.

BACKGROUND

A booster mounted on a vehicle having an idle stop function has been proposed. The booster boosts an input voltage supplied from a battery and outputs the boosted voltage to an in-vehicle device. For example, an exemplary booster includes a control unit that switches an output voltage of a booster circuit to a value higher than a value before restarting at the time of restarting after idle stop and before a cranking operation of an engine. This configuration reduces degree of voltage drop that occurs when restarting. This configuration makes it possible to avoid reset of an in-vehicle device due to a voltage drop.

SUMMARY

The present disclosure provides a booster that is mounted on a vehicle having an idle stop function. The booster boosts an input voltage supplied from a battery, and outputs the boosted input voltage to an in-vehicle device. The booster includes a booster circuit and an output voltage sensor. The booster circuit is a chopper-type, and includes a reactor having one end connected to the battery and a switching element connected between an other end of the reactor and a ground. The output voltage sensor detects an output voltage of the booster circuit.

BRIEF DESCRIPTION OF DRAWINGS

The features and advantages of the present disclosure will become more apparent from the following detailed description made with reference to the accompanying drawings. In the drawings:

FIG. 7A is a time chart showing an operation in a normal state according to a comparative example.

FIG. 7B is a time chart showing an operation in a MOS open failure according to the comparative example.

DETAILED DESCRIPTION

Figure 1:
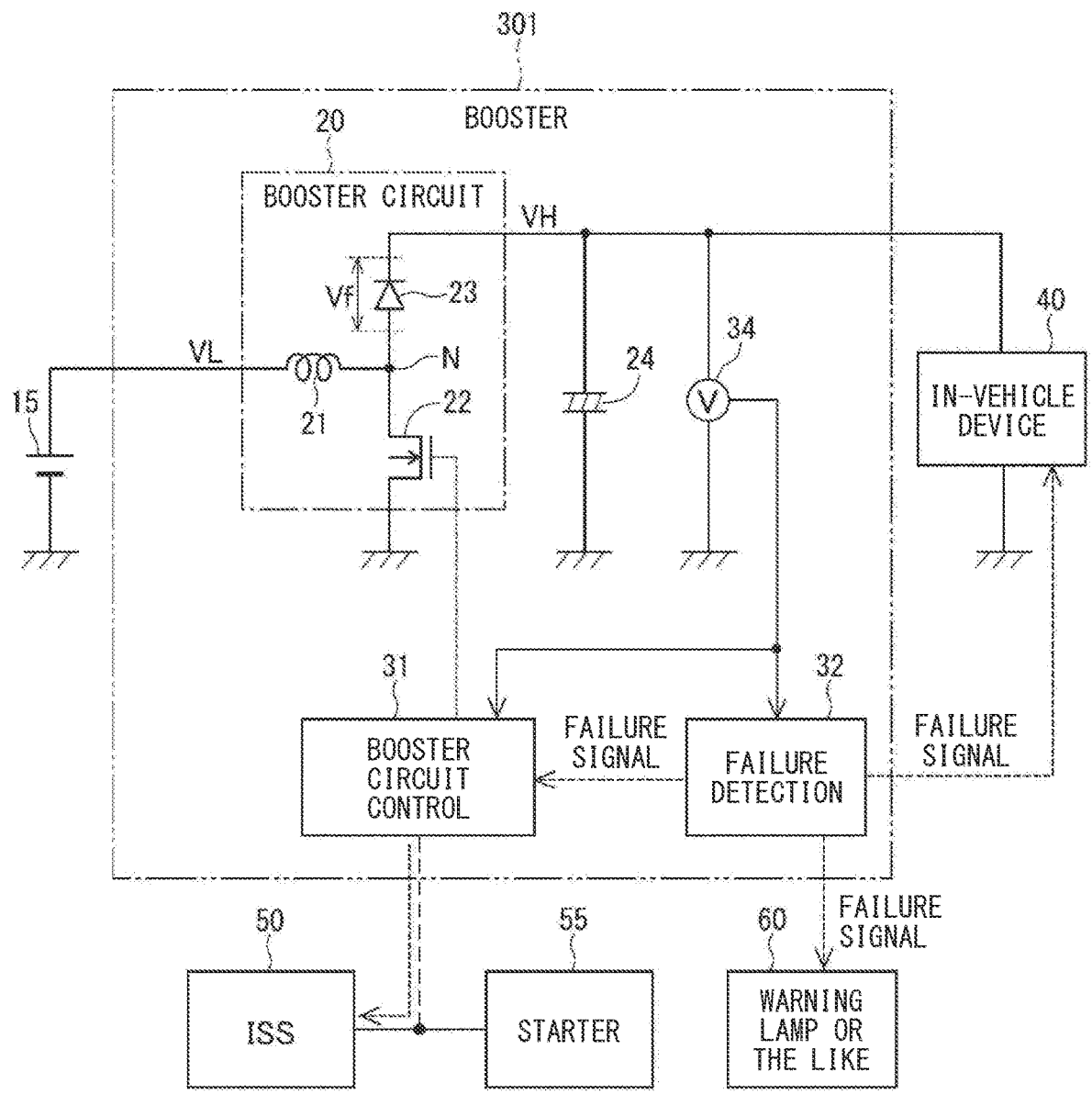
FIG. 1 is a configuration diagram showing a booster device according to a first embodiment.

For example, an exemplary booster includes a booster circuit, and the booster circuit is a chopper-type booster circuit including a reactor, a switching element, and a diode. Here, if an open failure occurs in the switching element such as a MOS, the booster circuit cannot operate normally. Thus, an in-vehicle device is reset when voltage drops due to cranking or the like. Therefore, it is required to detect an open failure of the switching element in an initial check after startup. A failure detection unit can detect an open failure of the switching element when an output voltage is less than a failure detection threshold value by using the failure detection threshold value set lower than the output voltage in a normal state.

When an input voltage of the booster circuit rises due to fluctuation of a battery SOC or the like, the output voltage at the time of open failure of the switching element becomes high, and it may be difficult to distinguish the output voltage at the time of open failure from the normal output voltage. If the normal control is performed without detecting an open failure of the switching element, the in-vehicle device may be reset due to the failure of the booster circuit when the voltage drops due to cranking or the like after idle stop.

The present disclosure provides a booster capable of accurately detecting an open failure of a switching element even when an input voltage of a booster circuit is high.

An exemplary embodiment of the present disclosure provides a booster that is mounted on a vehicle having an idle stop function. The booster is configured to boost an input voltage supplied from a battery and output the input voltage, which is boosted, to an in-vehicle device. The booster includes a booster circuit, an output voltage sensor, a booster circuit control unit, and a failure detection unit.

The booster circuit is a chopper-type, and includes a reactor having one end connected to the battery and a switching element connected between an other end of the reactor and a ground. The output voltage sensor is configured to detect an output voltage of the booster circuit. The booster circuit control unit is configured to control an operation of the switching element such that the output voltage of the booster circuit becomes a target voltage. The failure detection unit is configured to determine that the switching element is in an open failure when the output voltage is less than a predetermined failure detection threshold value in an initial check of the booster.

At least in a region where the input voltage is higher than a predetermined critical value, a target voltage in the initial check is set higher than a target voltage in a normal control that is an operation other than the initial check.

In the exemplary embodiment of the present disclosure, the target voltage in the normal control is preferably set as low as possible from the viewpoint of withstand voltage and heat generation of elements such as booster circuit. In the present disclosure, by setting the target voltage in the initial check higher than the target voltage in the normal control, a region of the input voltage at which the output voltage in the open failure of the switching element and in the normal state can be discriminated extends to a higher voltage region.

Therefore, the failure detection unit can accurately detect the open failure of the switching element while realizing the withstand voltage protection of the element and the reduction of heat generation during the normal control.

Hereinafter, multiple embodiments of a booster will be described with reference to the drawings. In the following embodiments, substantially same structural parts are designated with the same reference numerals thereby to simplify the description. The booster of the present embodiment is mounted on a vehicle having an idle stop function, boosts an input voltage supplied from a battery, and outputs the boosted voltage to an in-vehicle device. The in-vehicle device may be provided by an electric power steering device. In addition, the in-vehicle device may be any device that operates on battery power, such as a brake, a blower, a power window, and a wiper.

First Embodiment

FIG. 1 shows an overall configuration of a first embodiment. A booster 301 includes a booster circuit 20, a capacitor 24, an output voltage sensor 34, a booster circuit control unit 31, and a failure detection unit 32. The booster circuit 20 is a chopper-type booster circuit and includes a reactor 21, a MOS 22 as a "switching element", and a diode 23. In this specification, MOSFET is abbreviated and simply referred to as "MOS". Further, "an open failure of a MOS 22" is referred to as "a MOS open failure".

One end of the reactor 21 is connected to the battery 15. An element such as a diode may be connected between the battery 15 and the reactor 21. The MOS 22 is connected between the other end of the reactor 21 and the ground. Specifically, the drain terminal of the n-channel type MOS 22 is connected to the reactor 21, and the source terminal is grounded. In the diode 23, the anode is connected to a connection point N between the reactor 21 and the MOS 22, and the cathode is connected to the in-vehicle device 40. A voltage drop of the diode 23 is referred to as Vf.

The booster circuit 20 having the configuration of FIG. 1 functions exclusively as a circuit that boosts the power of the battery 15 and supplies the boosted power to the in-vehicle device 40, and does not assume a usage in which the power from the in-vehicle device 40 is stepped down and regenerated to the battery 15. Therefore, the "input" of the booster circuit 20 means the input from the battery 15, and the "output" of the booster circuit 20 means the output to the in-vehicle device 40. The booster circuit 20 boosts the input voltage VL by repeating the accumulation and release of the induced energy of the reactor 21 by the switching operation of the MOS 22, and outputs the output voltage VH.

When the in-vehicle device 40 is an electric power steering device, for example, the output voltage VH is used to generate an operating power supply for a microcomputer (generally a 5V power supply) via a power supply IC. Further, the voltage of the battery 15 is used as a power supply voltage of an inverter that supplies power to an assist motor through a path different from that of the booster circuit 20, that is, a so-called PIG voltage. Therefore, the following input voltage VL may be interpreted as a PIG voltage.

The input voltage VL does not always match with the battery voltage. For example, when an element such as a diode is connected between the battery 15 and the reactor 21, the input voltage VL is a voltage obtained by subtracting the voltage drop of the diode or the like from the battery voltage.

The capacitor 24 is provided on the output side of the booster circuit 20 and is charged by the output voltage VH.

The output voltage sensor 34 detects the output voltage VH and feeds it back to the booster circuit control unit 31. The booster circuit control unit 31 controls the operation of the MOS 22 typically by PWM control so that the output voltage VH of the booster circuit 20 becomes the target voltage.

A starter start signal is input to the booster circuit control unit 31 from an idle stop system ("ISS" in the FIG. 50 or a starter 55. As shown by the broken line in the figure, the starter start signal is not always directly communicated to the booster circuit control unit 31, and may be communicated via, for example, CAN or another control unit.

After starting the booster 301, an initial check is performed. For example, the output voltage sensor 34 or the like constituting the booster 301 may also be the target of the initial check, but in the present embodiment, particular attention is paid to the MOS open failure. It is assumed that the MOS 22 has not failed before the detection of the open failure. In this initial check, the failure detection unit 32 determines that the MOS open failure occurs when the output voltage VH is less than a predetermined failure detection threshold value. When the failure detection unit 32 determines that the MOS 22 is normal, the control shifts to a normal control. Hereinafter, the operation other than in the initial check is referred to as a normal control.

In the normal control, the booster circuit control unit 31 drives the booster circuit 20 in order to prevent the voltage drop and reset of the operating power supply of the microcomputer and the like due to the cranking of the starter 55 at the time of restarting after the idle stop. Specifically, it is required to secure a minimum voltage of about 4V. If the normal control is performed while the MOS 22 is in the open failure and the booster circuit 20 is inoperable, the in-vehicle device 40 may be reset when the input voltage VL drops due to the cranking or the like at the time of restart.

Therefore, it is required to detect a MOS open failure in the initial check and prevent reset due to a voltage drop. The failure detection unit 32 can detect a MOS open failure when the output voltage VH is less than the failure detection threshold value by using the failure detection threshold value set to a value lower than the output voltage VH in a normal state. This effect will be described in detail later.

When the failure detection unit 32 detects a MOS open failure, the failure detection unit 32 transmits a failure signal to each unit as shown by a short broken line in FIG. 1. For example, the failure detection unit 32 causes the booster circuit control unit 31 to stop the operation of the booster circuit 20. The idle stop system 50 that has received the failure signal via the booster circuit control unit 31 may prohibit idle stop and avoid restart cranking. Further, the in-vehicle device 40 that has received the failure signal may limit the output of the assist motor, for example, to an extent that boosting the PIG voltage is unnecessary. Alternatively, the warning lamp or the like 60 that has received the failure signal may output an alarm to the driver.

Next, the detection configuration of the MOS open failure according to the first embodiment will be described in comparison with a comparative example. First, reference to FIGS. 7A, 7B, and 8 for the comparative example. FIGS. 7A and 7B show operations in the normal state and in the MOS open failure. When the booster 301 is activated at time to, a constant input voltage VL indicated by a thick dash-dot line is input to the booster circuit 20. The failure detection threshold value VHth is set to a value between the input voltage VL and a target voltage VH*_n.

As shown in FIG. 7A, in the normal state, the output voltage VH is boosted to the target voltage VH*_n, and thereafter, the output voltage VH is maintained constant throughout the initial check period from time is to time te. At this time, the output voltage VH is equal to or higher than the failure detection threshold value VHth, and it is determined that the MOS 22 is normal. As shown in FIG. 7B, when an MOS open failure occurs, the output voltage VH shown by the thick solid line is a voltage obtained by subtracting the voltage drop Vf of the diode 23 from the input voltage VL. At this time, the output voltage VH is less than the failure detection threshold value VHth, and it is determined that the MOS 22 is in an open failure.

As described above, when the input voltage VL is lower than the target voltage VH*_n, the MOS open failure is detected accurately. However, the input voltage VL may rise to a maximum value VLmax indicated by the thin dash-dot line due to fluctuations in the battery SOC and the like. Then, when the output voltage VH becomes equal to or higher than the failure detection threshold value VHth as shown by the fine solid line, it is erroneously determined that the MOS 22 is in a normal state even though the MOS 22 has an open failure.

Figure 8:
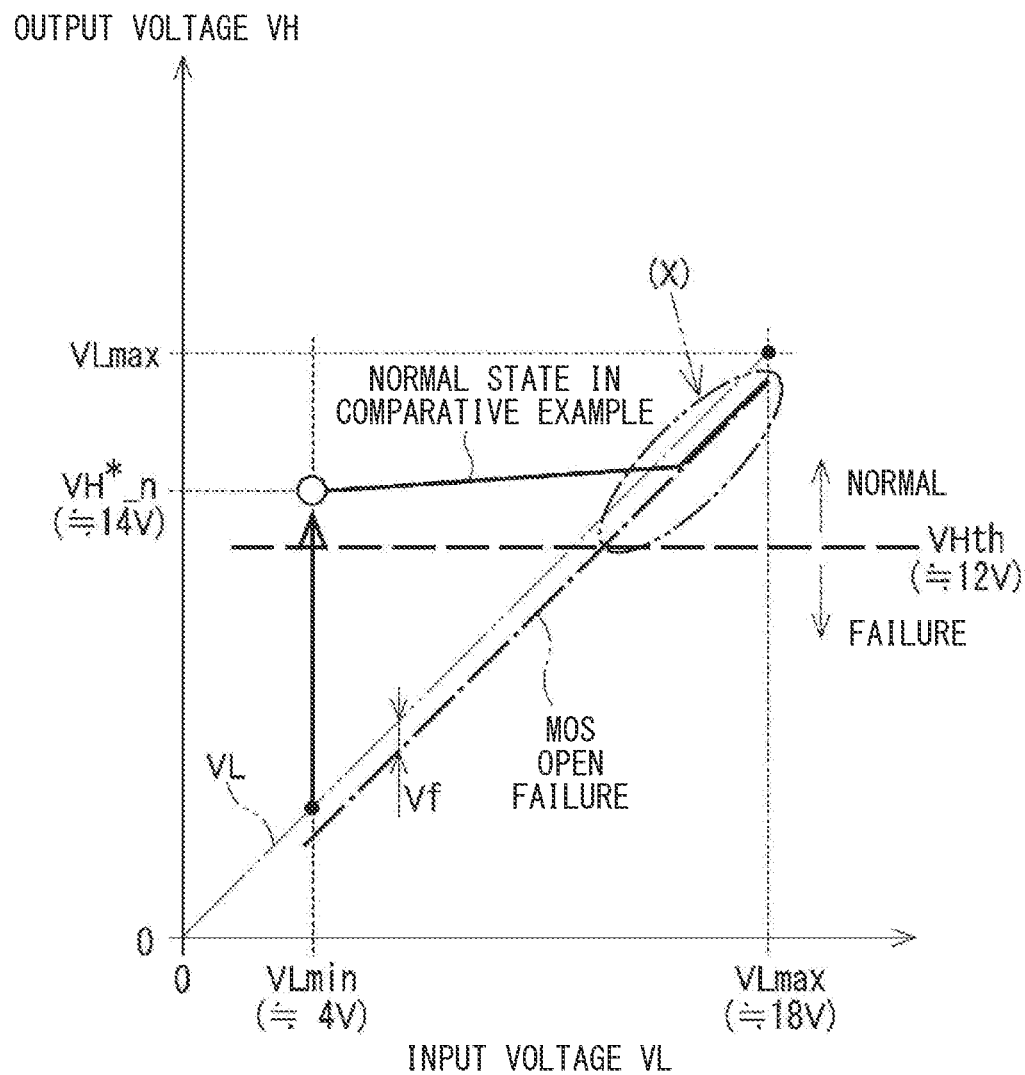
FIG. 8 is a diagram showing a relationship between an input voltage and a target voltage according to the comparative example.

The horizontal axis of FIG. 8 shows the maximum value VLmax of the input voltage and a minimum value VLmin as a practically usable lower limit value. In a vehicle 16V battery, the maximum value VLmax is about 18V and the minimum value VLmin is about 4V. Further, the vertical axis of FIG. 8 shows the output voltage VH on the same scale as the horizontal axis. The two-dot chain line corresponds to the output voltage VH (=VL) when the booster circuit 20 is not provided. The output voltage VH in the MOS open failure is indicated by the dash-dot line offset by the voltage drop Vf below the two-dot chain line. The target voltage VH*_n is set higher than the input voltage VL except in a region where the input voltage VL is relatively high. No boosting is performed in the region where the input voltage VL exceeds the target voltage VH*_n. Therefore, the output voltage VH in a normal state and the output voltage VH in a MOS open failure become the same value and cannot be discriminated.

For example, when the target voltage VH*_n is about 14V and the failure detection threshold value VHth is about 12V, as shown by the (X) mark, in a region where the input voltage VL in the initial check exceeds about 12V, the failure detection unit 32 is incapable of detecting the MOS open failure. In that case, it may be considered that the target voltage VH*_n may be set higher than the maximum value VLmax of the input voltage VL. However, if the output voltage VH during the normal control is set too high, it is not preferable from the viewpoint of withstand voltage and heat generation of elements such as the booster circuit 20.

Further, in a configuration in which another load capable of consuming a large amount of power is connected to the battery 15, it is conceivable that the battery 15 is forcibly discharged in the initial check to lower the input voltage VL. However, in reality, there is no load that can consume such a large amount of power, and even if it does exist, there is a great demerit of wasting power. Therefore, there is a need for a solution that achieves both protection of the withstand voltage of the element and reduction of heat generation during normal control and reliable detection of MOS open failure during initial check.

Figure 2A:
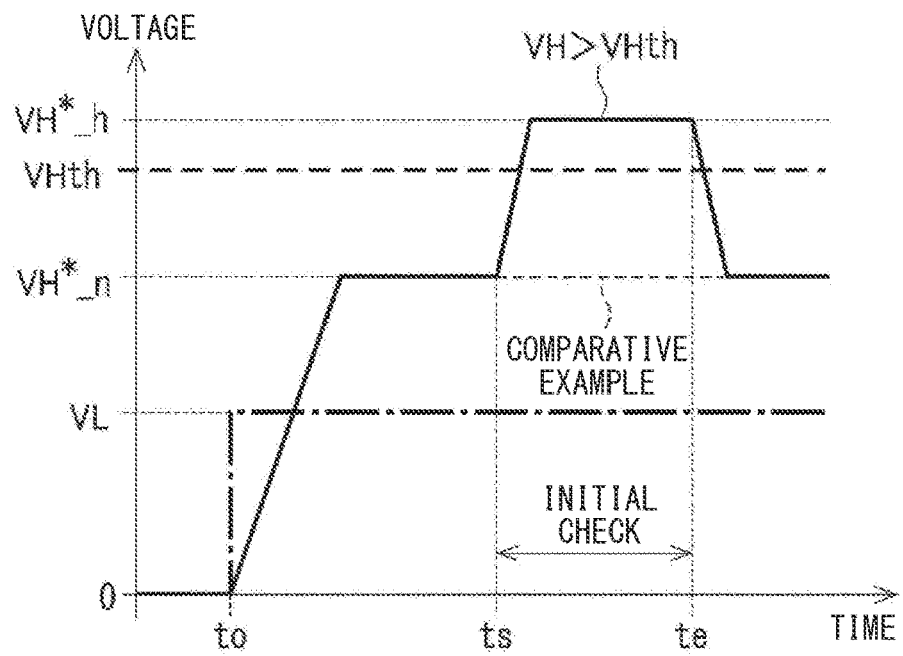
FIG. 2A is a time chart showing an operation in a normal state according to the first embodiment.
Figure 2B:
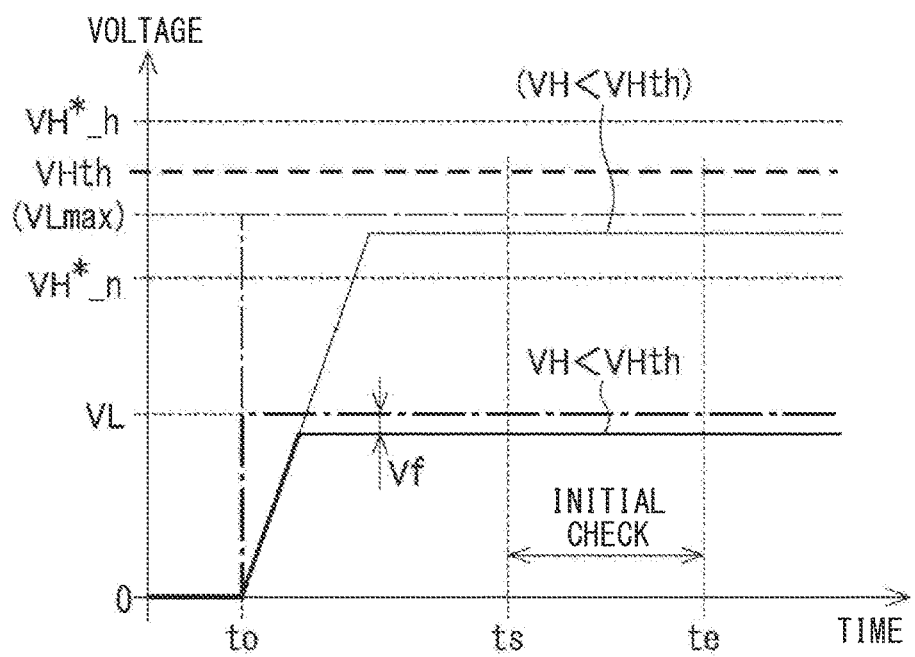
FIG. 2B is a time chart showing an operation in a MOS open failure according to the first embodiment.
Figure 3:
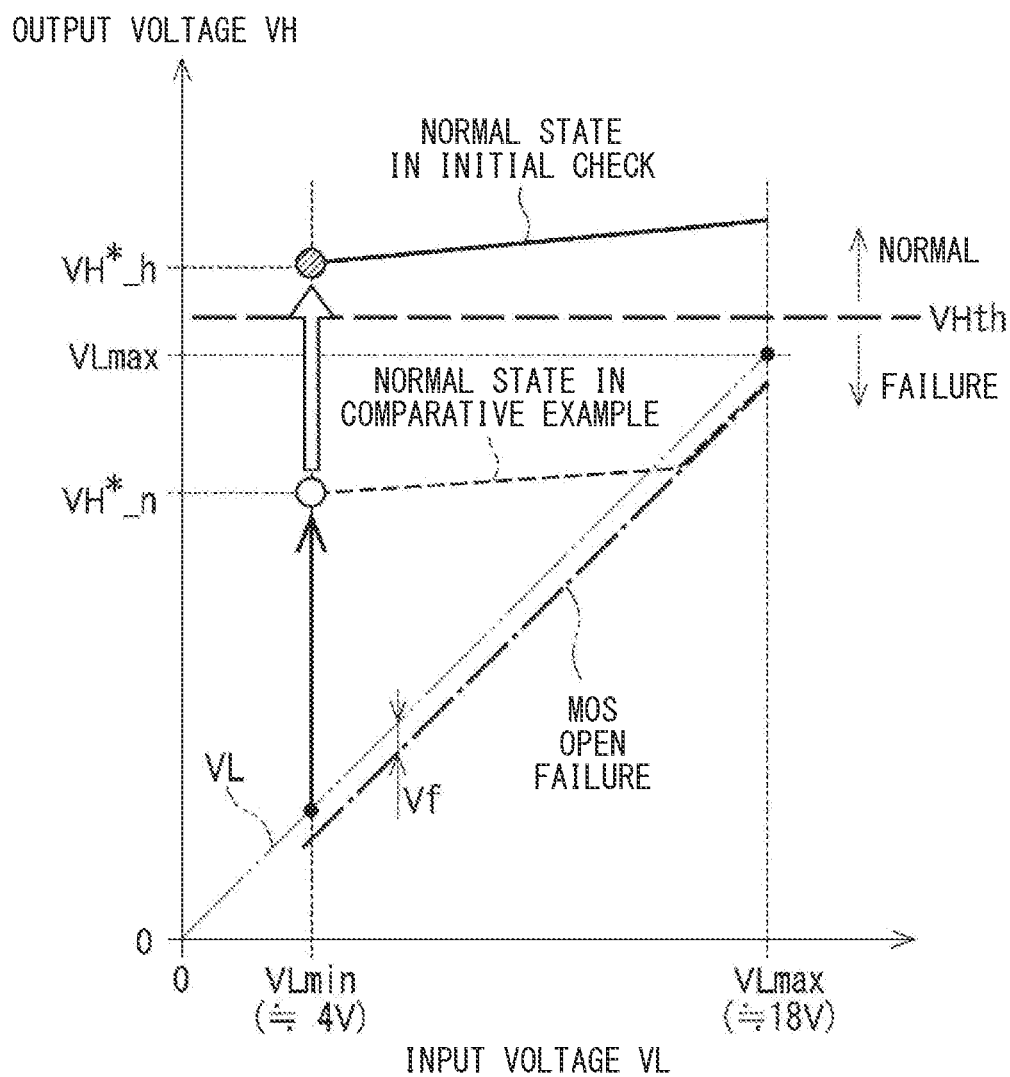
FIG. 3 is a diagram showing a relationship between an input voltage and a target voltage according to the first embodiment.

Subsequently, with reference to FIGS. 2A, 2B, and 3, a detection configuration of the first embodiment for solving the above difficulties will be described. FIGS. 2A, 2B, and 3 correspond to FIGS. 7A, 7B, and 8 of the comparative example. As shown in FIG. 2A, in the first embodiment, a two-step target voltage is set in the normal control and in the initial check. The target voltage VH*_h in the initial check is set higher than the target voltage VH*_n in the normal control. After the start of time to, the target voltage VH*_n is applied except in the initial check, and the target voltage VH*_h is applied during the initial check period from time is to time te.

Here, the target voltage VH*_n in the normal control is set lower than the maximum value VLmax of the input voltage, while the target voltage VH*_h in the initial check is set higher than the maximum value VLmax of the input voltage. Further, the failure detection threshold value VHth is set to a value between the maximum value VLmax of the input voltage and the target voltage VH*_h in the initial check.

At normal times in the initial check, the output voltage VH is further boosted from the target voltage VH*_n in the normal control to the target voltage VH*_h in the initial check. At this time, the output voltage VH is equal to or higher than the failure detection threshold value VHth, and it is determined that the MOS 22 is normal. As shown in FIG. 2B, in the MOS open failure, the output voltage VH is less than the failure detection threshold value VHth even at the maximum value VLmax of the input voltage, and it is determined that the MOS 22 has an open failure.

As shown in FIG. 3, in the first embodiment, the target voltage VH*_h in the initial check is set higher than the maximum value VLmax of the input voltage in the entire range from the minimum value VLmin to the maximum value VLmax of the input voltage regardless of the value of the input voltage VL. Further, the failure detection threshold value VHth is set to a constant value regardless of the value of the input voltage VL. This point is different from the second embodiment described later.

Figure 4:
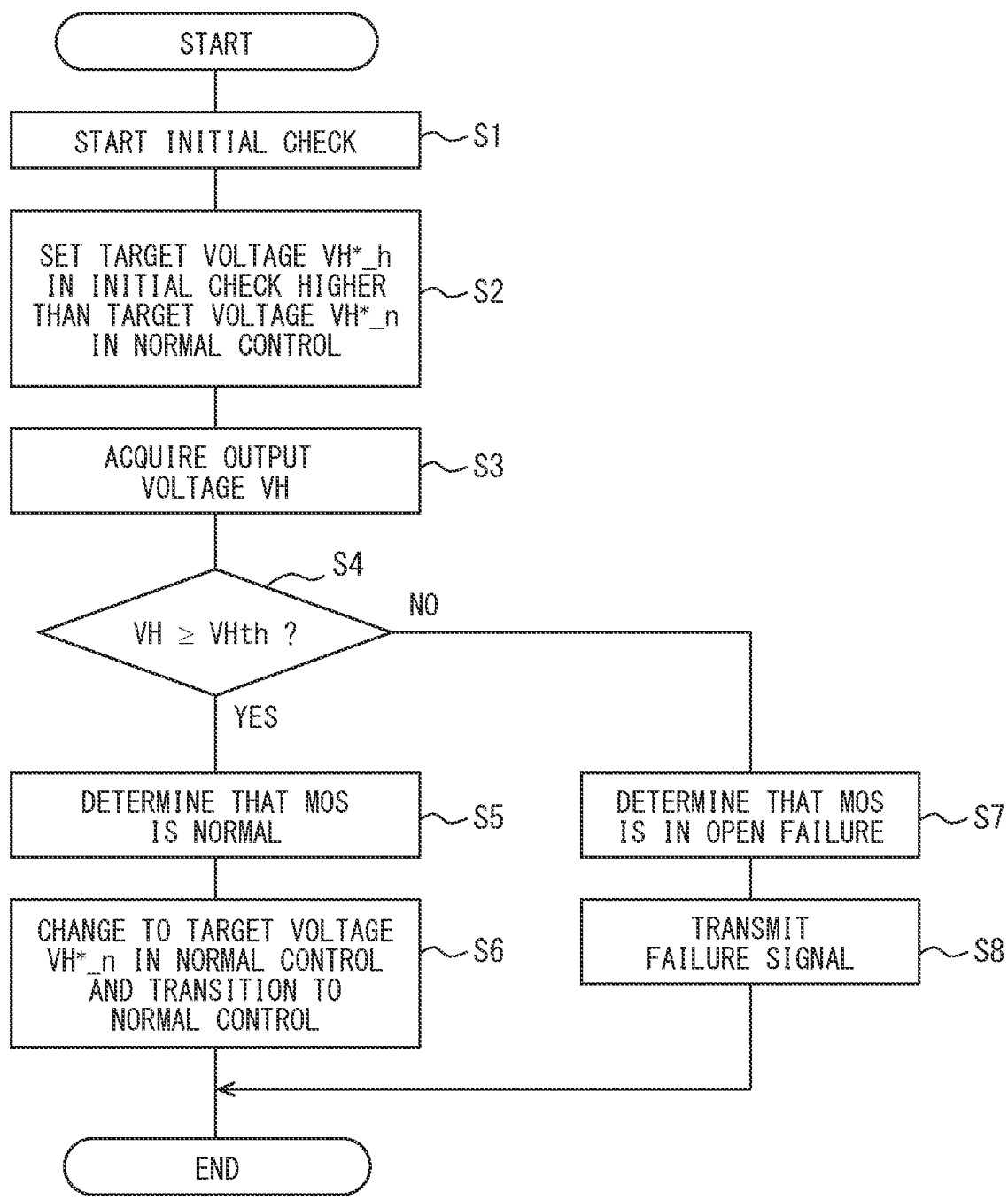
FIG. 4 is a flowchart of an initial check according to the first embodiment.

The processing of the initial check according to the first embodiment will be described with reference to the flowchart of FIG. 4. In the following flowchart, a symbol S indicates a step. In S1, the initial check is started when the booster 301 is started. In S2, the target voltage VH*_h in the initial check is set higher than the target voltage VH*_n in the normal control. Then, the booster circuit control unit 31 controls the operation of the MOS 22 so that the output voltage VH of the booster circuit 20 becomes the target voltage VH*_h.

In S3, the failure detection unit 32 acquires the output voltage VH detected by the output voltage sensor 34. In S4, the failure detection unit 32 determines whether the acquired output voltage VH is equal to or higher than the failure detection threshold value VHth. If YES in S4, it is determined that the MOS 22 is in the normal state in S5. When the initial check is completed in S6, the target voltage VH*_h in the initial check is changed to the target voltage VH*_n in the normal control. Then, if there is no abnormality in the initial check of other items, the control shifts to the normal control.

On the other hand, when the output voltage VH is less than the failure detection threshold value VHth and NO in S4, the failure detection unit 32 determines in S7 that the MOS open failure occurs. In S8, the failure detection unit 32 transmits a failure signal to each unit, the booster circuit control unit 31 stops the operation of the booster circuit 20, and the warning lamp or the like 60 generates an alarm to the driver.

As described above, in the booster 301 of the first embodiment, the target voltage VH*_n in the normal control is set as low as possible, and the target voltage VH*_h in the initial check is set higher than the target voltage VH*_n in the normal control. As a result, the region of the input voltage where the output voltage at the time of the MOS open failure and in the normal state can be discriminated expands to the region of higher voltage. Therefore, the failure detection unit 32 can accurately detect the MOS open failure while realizing the withstand voltage protection of the element and the reduction of heat generation during the normal control.

By accurately detecting the MOS open failure by the initial check and taking necessary measures, it is possible to prevent the in-vehicle device 40 from being reset due to the failure of the booster circuit 20 when the voltage drop due to cranking or the like after idle stop occurs. Therefore, it is possible to avoid a deterioration in the commercial value of the vehicle having the idle stop function.

In particular, the target voltage VH*_h in the initial check is set higher than the maximum value VLmax of the input voltage, and the failure detection threshold VHth is set to a value between the maximum value VLmax of the input voltage and the target voltage VH*_h in the initial check. As a result, the failure detection unit 32 can accurately detect the MOS open failure in the entire region of the input voltage VL. Further, in the first embodiment without the input voltage sensor, the target voltage VH*_h in the initial check and the failure detection threshold value VHth are set regardless of the value of the input voltage VL. Since no input voltage sensor is required, the device configuration is simplified.

Second Embodiment

Figure 5:
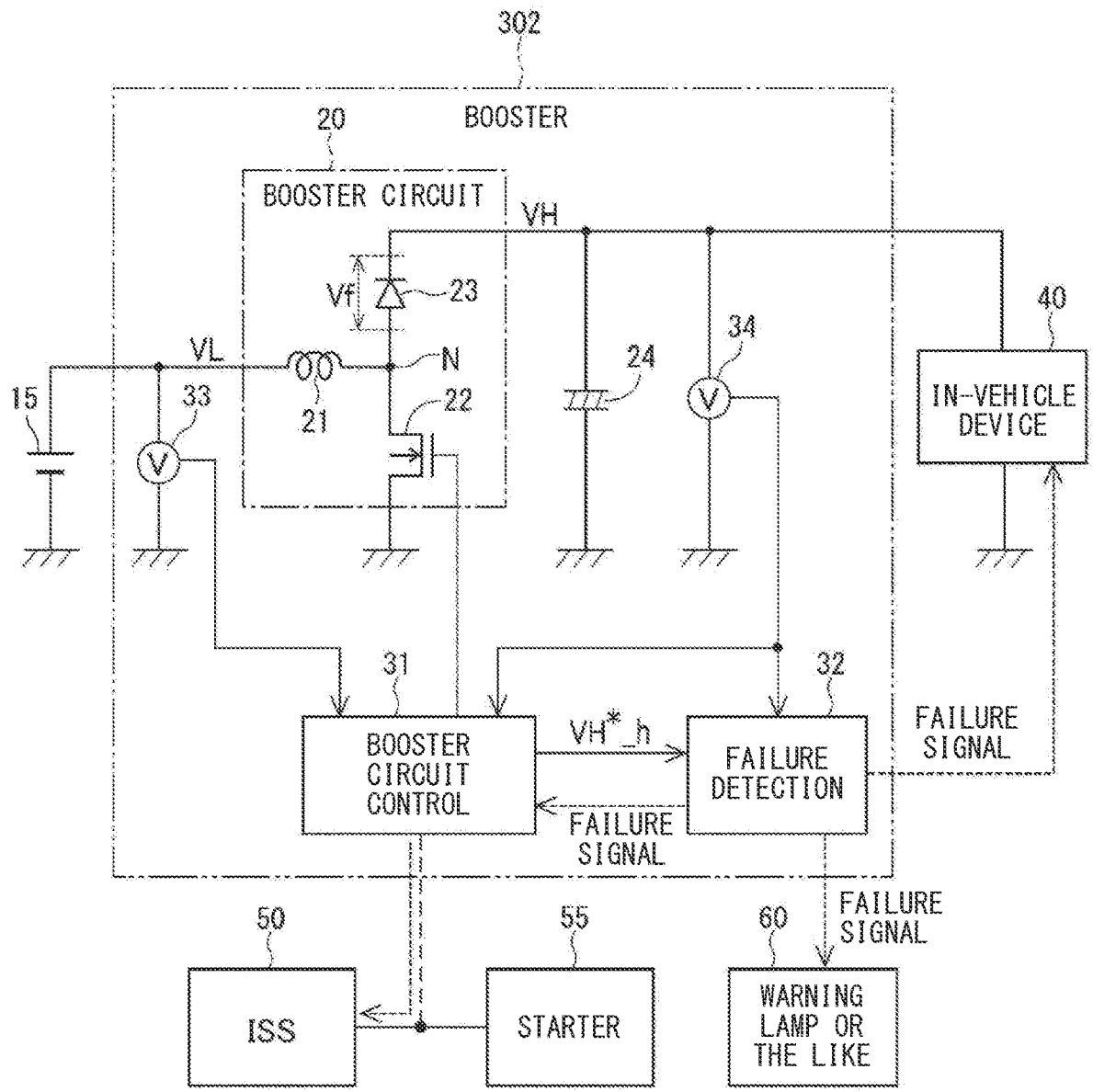
FIG. 5 is a configuration diagram showing a booster device according to a second embodiment.

Next, a second embodiment will be described with reference to FIGS. 5 and 6. As shown in FIG. 5, a booster 302 of the second embodiment further includes an input voltage sensor 33 for detecting the input voltage VL in addition to the configuration of the booster 301 of the first embodiment. The detected value of the input voltage VL is input to the booster circuit control unit 31.

Figure 6:
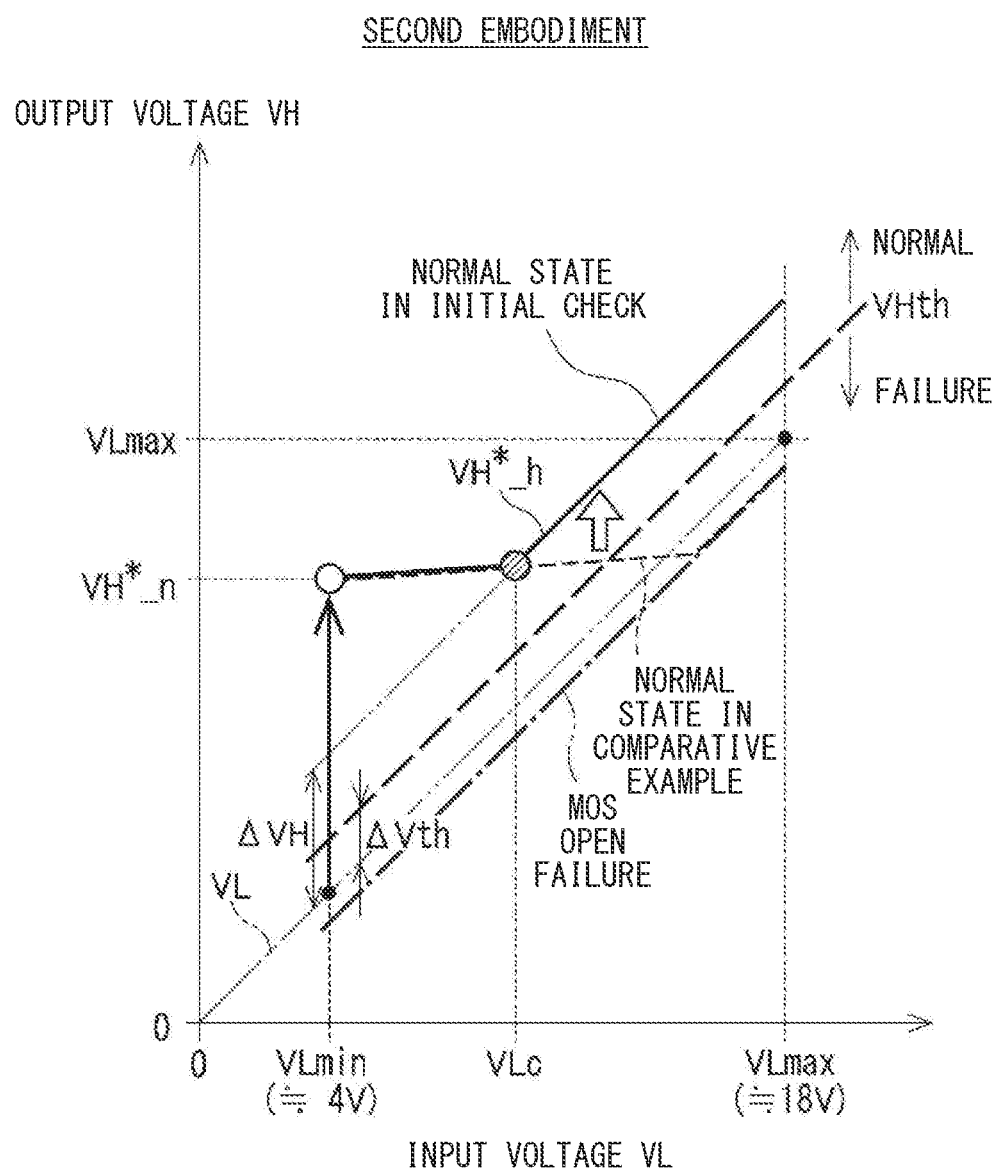
FIG. 6 is a diagram showing a relationship between an input voltage and a target voltage according to the second embodiment.

As shown in FIG. 6, the target voltage VH*_h in the initial check is set to a variable value higher than the input voltage VL based on the input voltage VL. For example, when a value (VL+ΔVH) obtained by adding a predetermined voltage difference ΔVH to the input voltage VL is higher than the target voltage VH*_n in the normal control, the target voltage VH*_h in the initial check is set to a value higher than "VL+ΔVH", that is, the target voltage VH*_n in the normal control. On the other hand, when the value (VL+ΔVH) obtained by adding the predetermined voltage difference ΔVH to the input voltage VL is equal to or less than the target voltage VH*_n in the normal control, the target voltage VH*_h in the initial check is set to a value same as the target voltage VH*_n in the normal control.

Here, the input voltage at which "VL+ΔVH=VH*_n" is expressed as a critical value VLc. In the second embodiment, in a region where the input voltage VL is higher than the critical value VLc, the target voltage VH*_h in the initial check is set to a variable value higher than a value of the target voltage VH*_n in the normal control. Therefore, taking the first and second embodiments into consideration, it can be said that "at least in the region where the input voltage VL is higher than the critical value VLc, the target voltage VH*_h in the initial check is set higher than the target voltage VH*_n in the normal control."

The failure detection unit 32 acquires the target voltage VH*_h in the initial check set by the booster circuit control unit 31. The failure detection threshold value VHth is set to a variable value between the input voltage VL and the target voltage VH*_h in the initial check. For example, a value (VL+ΔVth) obtained by adding the predetermined voltage difference ΔVth (<ΔVH) to the input voltage VL is set as the failure detection threshold value VHth.

As a result, in the second embodiment, the minimum target voltage VH*_h that can discriminate between the output voltage in the MOS open failure and in the normal state is set according to the actual input voltage VL in the initial check. Therefore, since the boosting in the initial check can be suppressed to the minimum, it is preferable from the viewpoint of protecting the withstand voltage of the element and reducing heat generation.

The relationship between the input voltage VL, the target voltage VH*_h, and the failure detection threshold VHth may have characteristics in which the target voltage VH*_h and the failure detection threshold VHth change in a stepwise manner, other than linear characteristics shown in FIG. 6. By limiting the values that can be taken by the target voltage VH*_h and the failure detection threshold value VHth to a finite number, the calculation load of the booster circuit control unit 31 and the failure detection unit 32 can be reduced.

Other Embodiments (A) In the booster circuit 20 of the above embodiments, a "step up and down circuit" that can regenerate power by stepping down power from the in-vehicle device 40 may be used by providing a second MOS in place of the diode 23 connected to the output side of the connection point N between the reactor 21 and the MOS 22. Even in that configuration, in this embodiment, only the function as a booster circuit is focused on.

(B) The switching element is not limited to the MOSFET, and may be composed of other types of transistors or the like.

(C) In FIGS. 1 and 5 of the above embodiment, the booster circuit control unit 31 and the failure detection unit 32 are shown as separate blocks for convenience of explanation, but the booster circuit control unit 31 and the failure detection unit 32 may be integrally configured. In that case, the transmission of the failure signal from the failure detection unit 32 to the booster circuit control unit 31 and the acquisition of the target voltage VH*_h in the second embodiment are processed inside one block.

The present disclosure should not be limited to the embodiment described above. Various other embodiments may be implemented without departing from the scope of the present disclosure.

The control unit and the technique according to the present disclosure may be achieved by a dedicated computer provided by constituting a processor and a memory programmed to execute one or more functions embodied by a computer program. Alternatively, the control circuit and the method described in the present disclosure may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A booster that is mounted on a vehicle having an idle stop function, configured to boost an input voltage supplied from a battery and output the input voltage, which is boosted, to an in-vehicle device, the booster comprising:
   a booster circuit that is a chopper-type, and includes a reactor having one end connected to the battery and a switching element connected between an other end of the reactor and a ground;
   an output voltage sensor configured to detect an output voltage of the booster circuit;
   a booster circuit control unit configured to control an operation of the switching element such that the output voltage of the booster circuit becomes a target voltage; and
   a failure detection unit configured to determine that the switching element is in an open failure when the output voltage is less than a predetermined failure detection threshold value in an initial check of the booster, wherein
   at least in a region where the input voltage is higher than a predetermined critical value, a target voltage in the initial check is set higher than a target voltage in a normal control that is an operation other than the initial check.

2. The booster according to claim 1, wherein
   the target voltage in the initial check is set higher than a maximum value of the input voltage regardless of a value of the input voltage, and
   the failure detection threshold value is set to a constant value between the maximum value of the input voltage and the target voltage in the initial check.

3. The booster according to claim 1, further comprising an input voltage sensor configured to detect the input voltage, wherein
   the target voltage in the initial check is set to a variable value higher than a value of the input voltage based on the input voltage, and
   the failure detection threshold value is set to a variable value between the input voltage and the target voltage in the initial check.

* * * * *